United States Patent
Kee et al.

(10) Patent No.: US 11,996,565 B2
(45) Date of Patent: May 28, 2024

(54) DUAL-SPIRAL CHANNEL FLOW IN ELECTROCHEMICAL DEVICES

(71) Applicant: Colorado School of Mines, Golden, CO (US)

(72) Inventors: Robert J. Kee, Arvada, CO (US); Huayang Zhu, Arvada, CO (US)

(73) Assignee: Colorado School of Mines, Golden, CO (US)

( * ) Notice: Subject to any disclaimer, the term of this patent is extended or adjusted under 35 U.S.C. 154(b) by 429 days.

(21) Appl. No.: 17/029,850

(22) Filed: Sep. 23, 2020

(65) Prior Publication Data
US 2021/0091386 A1    Mar. 25, 2021

Related U.S. Application Data

(60) Provisional application No. 62/904,326, filed on Sep. 23, 2019.

(51) Int. Cl.
| | |
|---|---|
| H01M 4/86 | (2006.01) |
| H01M 4/90 | (2006.01) |
| H01M 8/1004 | (2016.01) |

(52) U.S. Cl.
CPC ....... H01M 4/8626 (2013.01); H01M 4/9083 (2013.01); H01M 8/1004 (2013.01)

(58) Field of Classification Search
CPC ............. H01M 4/8626; H01M 4/9083; H01M 8/1004; H01M 8/1213; H01M 2300/0074;
(Continued)

(56) References Cited

U.S. PATENT DOCUMENTS

| | | | |
|---|---|---|---|
| 4,910,100 A | * | 3/1990 | Nakanishi ........... H01M 8/2457 429/441 |
| 2002/0106548 A1 | | 8/2002 | Chung et al. |
| 2009/0081524 A1 | | 3/2009 | Yamauchi et al. |

FOREIGN PATENT DOCUMENTS

| | | |
|---|---|---|
| KR | 10-2005-0093173 | 9/2005 |
| WO | WO 03/088378 | 10/2003 |
| WO | WO 2019/117859 | 6/2019 |

OTHER PUBLICATIONS

Decaluwe et al., "On the Fundamental and Practical Aspects of Modeling Complex Electrochemical Kinetics and Transport," Journal of the Electrochemical Society, vol. 165, No. 13, Jan. 1, 2018, 3 pages. Abstract Only.

(Continued)

*Primary Examiner* — Helen Oi K Conley
(74) *Attorney, Agent, or Firm* — Sheridan Ross P.C.

(57) ABSTRACT

Electrode plates with feed and product channels are provided that present more spatially uniform chemical and electrochemical compositions to catalytically active electrode structures and ion-conducting electrolyte membrane layers to improve the performance and increase the longevity of the electrochemical devices (e.g., membrane reactors, gas-separation cells, electrochemical compressors, fuel cells, and electrolyzers). Each plate can have a single channel that extends between an inlet and an outlet, and each channel can have a first segment that spirals inwardly from the inlet to a midpoint and a second segment that spirals outwardly from the midpoint to the outlet. The segments are interleaved with each other such that there are alternating flows of less-depleted feed or product and more-depleted feed or product. Consequently, chemical, electrochemical, and thermal behaviors are more uniformly distributed across the membrane-electrode assembly to increase performance and longevity of the assembly.

16 Claims, 9 Drawing Sheets

(58) Field of Classification Search
CPC .......... H01M 8/2432; H01M 4/9066; H01M 8/2483; H01M 8/0263; Y02E 60/50; C25B 1/02; C25B 9/23; C25B 9/75; C25B 9/77
See application file for complete search history.

(56) References Cited

OTHER PUBLICATIONS

Duan et al., "Highly durable, coking and sulfur tolerant, fuel-flexible protonic ceramic fuel cells," Nature, vol. 557, May 9, 2018, pp. 217-222. Abstract Only.
Duan et al., "Highly efficient reversible protonic ceramic electrochemical cells for power generation and fuel production," Nature Energy, vol. 4, Mar. 11, 2019, pp. 230-240. Abstract Only.
Jennings et al., "Measurement and Characterization of a High-Temperature, Coke-Resistant Bi-functional Ni/BZY15 Water-Gas-Shift Catalyst Under Steam-Reforming Conditions," Catalysis Letters, vol. 148, Oct. 5, 2018, pp. 3592-3607. Abstract Only.
Juárez-Robles et al., "Three Dimensional Analysis of a PEM Fuel Cell with the Shape of a Fermat Spiral for the Flow Channel Configuration," Proceedings of IMECE2008: ASME international Mechanical Engineering Congress and Exposition, No. IMECE2008-68101, dated Oct. 31, 2008, 11 pages.
Kee et al., "Thermodynamic Insights for Electrochemical Hydrogen Compression with Proton-Conducting Membranes," Membranes, vol. 9, No. 77, Jul. 1, 2019, 14 pages.
Malerød-Fjeld et al., "Thermo-electrochemical production of compressed hydrogen from methane with near-zero energy loss," Nature Energy, vol. 2, Nov. 13, 2017, pp. 923-931.
Zhu et al., "Defect Chemistry and Transport within Dense BaCe0.7Zr0.1Y0.1Yb0.1O3—σ (BCZYYb) Proton-Conducting Membranes," Journal of the Electrochemical Society, vol. 165, No. 10, Jul. 25, 2018, 3 pages. Abstract Only.
Zhu et al., "Defect Incorporation and Transport within Dense BaZr0.8Y0.2O3—σ (BZY20) Proton-Conducting Membranes," Journal of the Electrochemical Society, vol. 165. No. 9, May 26, 2018, 3 pages. Abstract Only.
Zhu et al., "Equilibrium thermodynamic predictions of coking propensity in membrane-based dehydrogenation of hydrocarbons and alcohols," Catalysis Today, vol. 331, Jul. 1, 2019, pp. 7-11. Abstract Only.

Zhu et al., "Thermodynamic Analysis of Energy Efficiency and Fuel Utilization in Protonic-Ceramic Fuel Cells with Planar Co-Flow Configurations," Journal of the Electrochemical Society, vol. 165, No. 11, Aug. 16, 2018, 3 pages. Abstract Only.
Invitation To Pay Additional Fees for International (PCT) Patent Application No. PCT/US2020/052237, dated Dec. 1, 2020, 19 pages.
International Preliminary Report on Patentability for International (PCT) Patent Application No. PCT/USU2020/052237, dated Apr. 7, 2022, 7 pages.
International Search Report and Written Opinion for International (PCT) Patent Application No. PCT/USU2020/052237, dated Feb. 5, 2021, 13 pages.
Decaluwe et al., "On the Fundamental and Practical Aspects of Modeling Complex Electrochemical Kinetics and Transport," Journal of the Electrochemical Society, vol. 165, No. 13, Jan. 1, 2018, 33 pages.
Duan et al., "Highly durable, coking and sulfur tolerant, fuel-flexible protonic ceramic fuel cells," Nature, vol. 557, May 9, 2018, pp. 217-222.
Duan et al., "Highly efficient reversible protonic ceramic electrochemical cells for power generation and fuel production," Nature Energy, vol. 4, Mar. 11, 2019, pp. 230-240.
Jennings et al., "Measurement and Characterization of a High-Temperature, Coke-Resistant Bi-functional Ni/BZY15 Water-Gas-Shift Catalyst Under Steam-Reforming Conditions," Catalysis Letters, vol. 148, Oct. 5, 2018, pp. 3592-3607.
Zhu et al., "Defect Chemistry and Transport within Dense BaCe0.7Zr0.1Y0.1Yb0.1O3—σ (BCZYYb) Proton-Conducting Membranes," Journal of the Electrochemical Society, vol. 165, No. 10, Jul. 25, 2018, pp. F845-F853.
Zhu et al., "Defect Incorporation and Transport within Dense BaZr0.8Y0.2O3—σ (BZY20) Proton-Conducting Membranes," Journal of the Electrochemical Society, vol. 165, No. 9, May 26, 2018, pp. F581-F588.
Zhu et al., "Equilibrium thermodynamic predictions of coking propensity in membrane-based dehydrogenation of hydrocarbons and alcohols," Catalysis Today, vol. 331, Jul. 1, 2019, pp. 7-11.
Zhu et al., "Thermodynamic Analysis of Energy Efficiency and Fuel Utilization in Protonic-Ceramic Fuel Cells with Planar Co-Flow Configurations," Journal of the Electrochemical Society, vol. 165, No. 11, Aug. 16, 2018, pp. F942-F950.

* cited by examiner

DUAL-SPIRAL CHANNEL FLOW IN ELECTROCHEMICAL DEVICES

CROSS-REFERENCE TO RELATED APPLICATIONS

This application claims priority under 35 U.S.C. § 119(e) to U.S. Provisional Patent Application Ser. No. 62/904,326 filed Sep. 23, 2019, which is incorporated herein in its entirety by reference.

FIELD OF THE INVENTION

Embodiments of the present disclosure are related to electrochemical devices (e.g., membrane reactors, gas-separation cells, electrochemical compressors, fuel cells, and electrolyzers) that incorporate gas flow channels with changing compositions of chemically and electrochemically active species within the channels.

BACKGROUND OF THE INVENTION

Electrochemical devices (e.g., membrane reactors, gas-separation cells, electrochemical compressors, fuel cells, and electrolyzers) typically use gas channels to direct chemically and electrochemically active species over a membrane-electrode assembly (MEA). The present disclosure is particularly concerned with gas-channel configurations that promote spatially uniform chemical, electrochemical, and thermal performance throughout the MEA. The gas channels are typically embedded into electrode structures. One purpose of the electrode structures is to maintain voltage differences across the MEA. The electrodes may also have catalytic functions, such as reforming natural gas to form other species that may include hydrogen, carbon monoxide, carbon dioxide, etc. In a planar stack of electrochemical cells that are electrically connected in series, the electrodes are usually called bi-polar plates.

Electrochemical membrane reactors constitute a general category of electrochemical devices where chemical and electrochemical reactions take place on one side of a membrane and ionized species and/or heat are transported to the other side of the membrane as integral features of their function. Common embodiments of membrane reactors include solid oxide fuel cells (SOFC), protonic ceramic fuel cells (PCFC), electrolyzers, gas separations, and electrochemical-compression devices. In all these cases, electroactive species (i.e., charged defects, ions, and small polarons) are transported across the membrane separator from one side to the other. This has the effect of changing the composition (e.g., mole fractions) of gas species on either side of the membrane. Generally, the chemical reactions involving the electroactive species either generate or consume heat, which requires the membrane to play a key role in the conductive and convective heat transfer processes.

In electrochemical membrane reactors, gas-flow channels are disposed between electrodes that provide the electrical potential differences required to transport the ions of the electroactive species across the membrane. The transport of these electroactive species changes the composition of the gas on either side of the membrane as the gases flow along the channel from the inlet to the outlet. This change in gas composition has two consequences: 1) chemical reactions (e.g., fuel reforming) occurring within the catalytic porous composite electrode, and 2) the electrochemical potential of the electroactive species vary spatially along the length of the channel path. Both of these effects have significant impact on the performance of the membrane reactor and constitute a challenge in the design of the device with respect to the flow channels.

A membrane separation reactor for extracting purified hydrogen gas from a mixed gas stream, such as synthesis gas from steam reforming of methane, provides an illustrative example. Hydrogen is the electroactive species and hydrogen, in the form of hydrogen ions (i.e., protons), is transported across the ionically conducting separation membrane by imposing a voltage to the electrodes on the respective surfaces of the membrane. In so doing, hydrogen may be extracted from a fuel channel containing a mixture of reformate gas species containing CO, $CO_2$, $H_2O$ plus various other low-molecular-weight hydrocarbons and transported to the other side of the membrane as purified hydrogen. The removal of hydrogen along the length of the feed channel shifts the local composition, either generating or consuming heat in the process. In addition, the hydrogen partial pressure varies along the length of the flow channel, changing the Nernst potential with respect to the purified hydrogen on the other side of the membrane.

Figure 1:
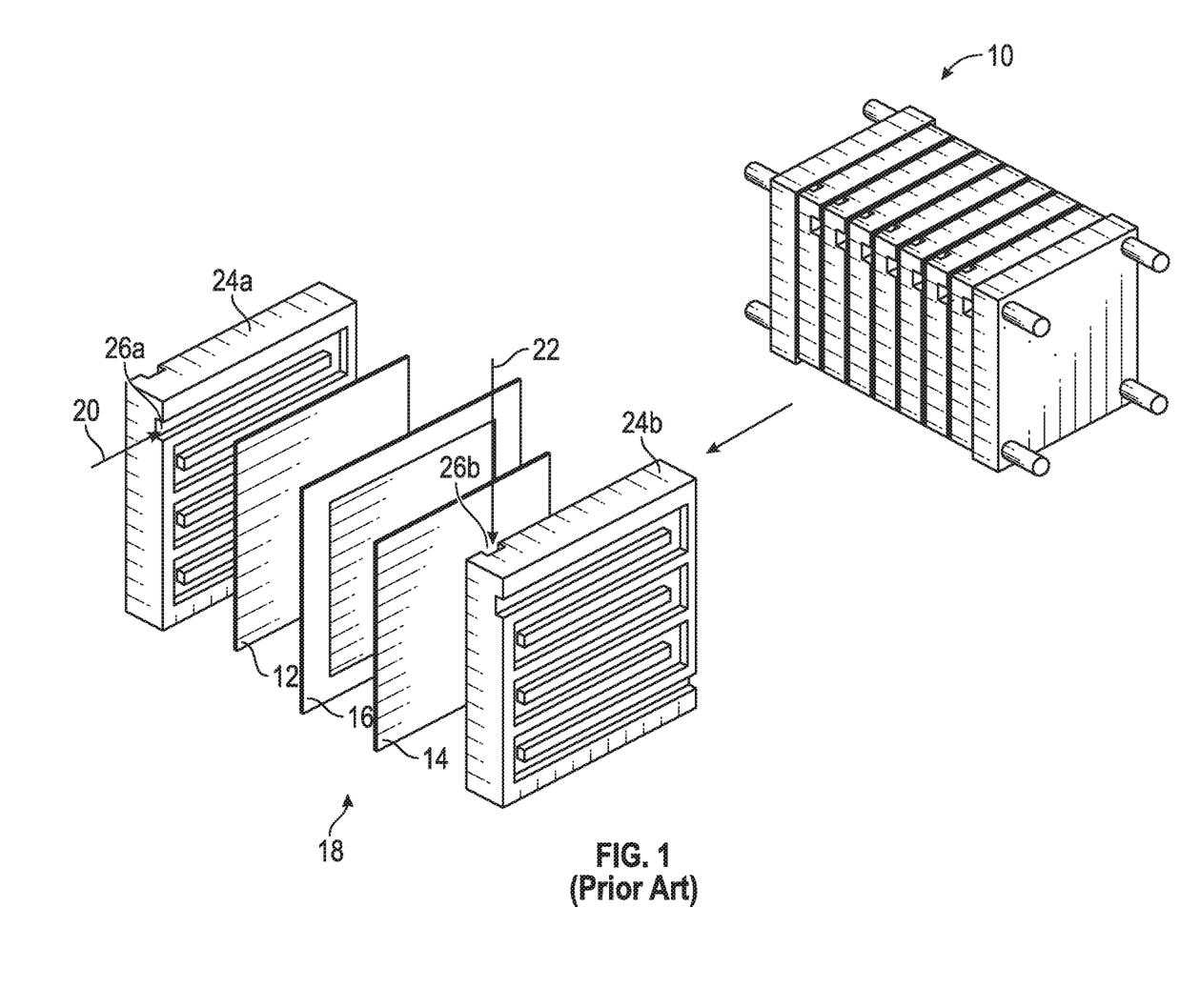
FIG. 1 is a perspective view of a prior art electrochemical membrane reactor, such as a fuel cell.

Fuel cells represent one example of membrane reactors where these same basic ideas apply. As shown in FIG. 1, a fuel cell 10 can have an anode 12, a cathode 14, an electrolyte membrane 16 that together form a membrane-electrode assembly 18. These assemblies 18 can have a planar shape where one of a fuel 20 or an oxidizer 22 contacts one planar side of the assembly 18 and the other of the fuel 20 or the oxidizer 22 contacts the other planar side of the assembly 18. The fuel 20 and oxidizer 22 react with the different layers 12, 14 to produce electricity. More broadly speaking, the fuel and oxidizer flows in a membrane reactor may be called the "feed flow" and the "product flow."

Plates 24a, 24b direct the feed flow 20 and the product flow 22 onto the membrane-electrode assembly 18. The electrode layers 12, 14 may be porous composite structures that house an electrical conductor and a catalyst. Specifically, a first electrode plate 24a directs the feed flow 20 onto one composite electrode layer 12, and a second electrode plate 24b directs the product flow 22 onto another electrode plate (e.g., cathode) 14. Each bipolar plate 24a, 24b has a respective channel 26a, 26b that guides the feed flow 20 or product flow 22 from an inlet to an outlet of each plate 24a, 24b. These channels 26a, 26b typically extend between the inlet and the outlet of each plate 24a, 24b in a non-linear path to increase the areas of the composite electrode layers 12, 14 that are exposed to the feed flow 20 or product flow 22.

In some embodiments there may be no flow entering the product channel. For example, in a hydrogen separation cell, the hydrogen that crosses the membrane is exhausted from one end of the product channel. In other cases, there may be a sweep flow that enters the product channel, with both the sweep and the produced hydrogen leaving the product channel.

Figure 2A:
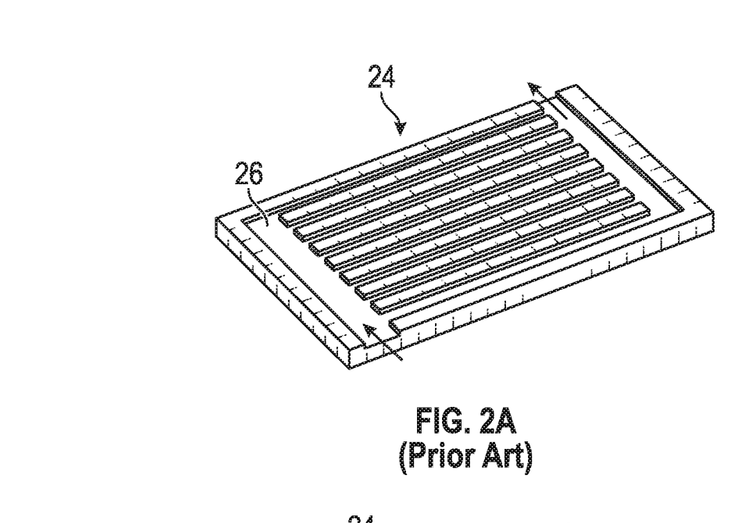
FIGS. 2A-2D are perspective views of prior art plates for use in membrane reactors.
Figure 2B:
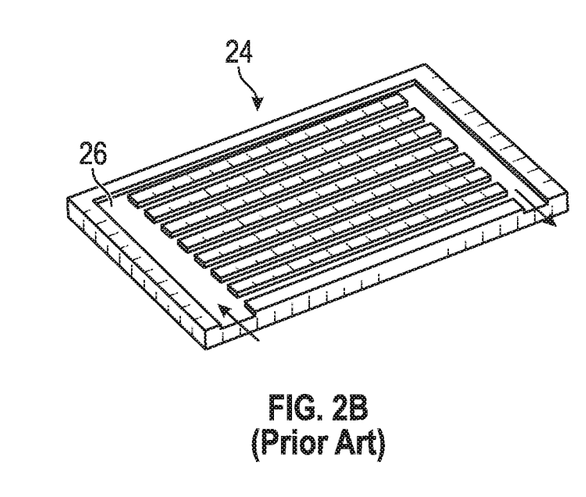
Figure 2C:
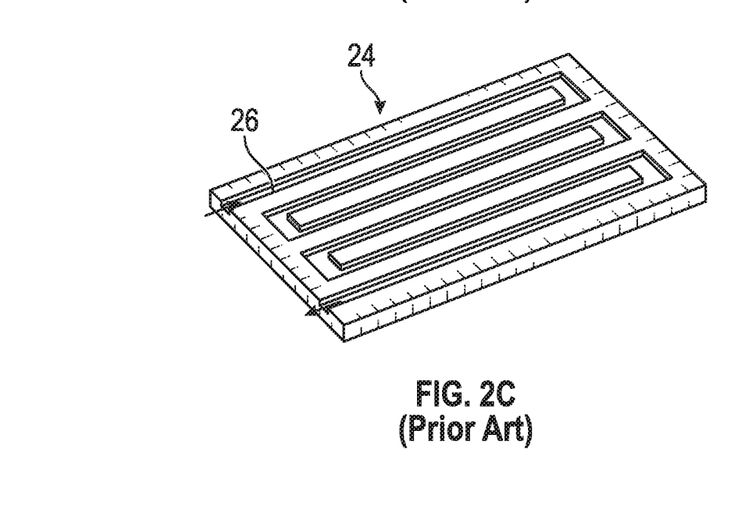
Figure 2D:
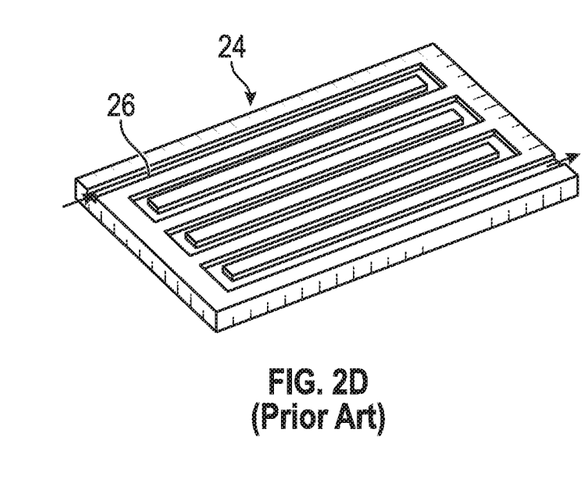

FIGS. 2A-2D show various channel 26 configurations on prior art plates 24 where the channel 26 extends between an inlet and an outlet in one or more non-linear paths. Referring to FIGS. 2A and 2B, the channels 26 in these plates 24 are manifolded with multiple sub-channels arranged parallel in a "Z" configuration and "H" configuration, respectively. Referring to FIGS. 2C and 2D, the channels 26 in these plates 24 are a single, serpentine channel 26 in a "same end" inlet/outlet arrangement and "opposite end" inlet/outlet arrangement, respectively.

However, there are performance issues related to existing plates and channel configurations. As the feed flow or product flow travels through the channel, the feed flow or oxidizer reacts with the layers and is consumed. As a result, the composition of the fuel or product flow changes along the length of the channel. For example, in a fuel cell, a fuel such as hydrogen can react on the composite anode of the membrane-electrode assembly and then exit the fuel cell with a depleted hydrogen composition since some hydrogen was used in the reaction on the anode of the membrane-electrode assembly. Near the exit of the fuel cell, the fuel has been depleted and diluted with exhaust, reducing performance in this local region of the fuel cell. Nernst potential represents electrochemical potential to drive a charge-transfer reaction, and the depletion of fuel in the fuel cell can be characterized as a reduction in Nernst potential along the length of the channel. This can have deleterious effects on a fuel cell not only in performance, but in reliability. A difference in electrochemical performance results in a difference in temperature, as much as 100° C., and the channel configurations in FIGS. 1-2D result in a temperature gradient that can damage more delicate materials of the membrane-electrode assembly such as ceramics. It is an object of the disclosure to address these issues and others.

SUMMARY OF THE INVENTION

The above shortcomings and other needs are addressed by the various embodiments and configurations of the present disclosure. It is an objective of the present disclosure to provide plates with alternating channels of less-depleted and more-depleted feed flows and alternating channels of less-depleted and more-depleted product flows so that more spatially uniform feed and product compositions are presented to the layers of the membrane-electrode assembly. Thus, a more spatially uniform Nernst potential and smaller temperature gradients are imposed on the layers of the membrane-electrode assembly, which enhances the performance and longevity of the membrane-electrode assembly and membrane reactor.

One aspect of embodiments of the present disclosure is to provide a plate with a channel arranged in a dual-spiral, interleaving configuration to present a more spatially uniform feed and product composition to layers of a membrane-electrode assembly in a membrane reactor. The plate can have a single, continuous channel that extends between an inlet and an outlet, and the channel can have a first segment that extends between the inlet and a midpoint and can have a second segment that extends from the midpoint to the outlet. The first segment turns about an axis extending through the plate in a first direction and in smaller and smaller turns until the first segment reaches the midpoint. The second segment turns about the axis in an opposing second direction and in larger and larger turns until the second segment reaches the outlet. The second segment may also terminate in a 'dead end' so that there is no inlet flow. The first and second segments are interleaved such that, when the plate is viewed in cross section, the first and second segments alternate positions across the plate. Since the first segment has less-depleted feed flow or product flow and the second segment has more-depleted feed flow or product flow, the cross section of the plate and channel alternates between less-depleted feed flow or product flow and more-depleted feed flow or product flow. As a result, more spatially uniform feed flow and product flow compositions are presented to the layers of the membrane-electrode assembly.

Another aspect of embodiments of the present disclosure is to provide a membrane reactor that maximizes the transfer of ions and/or electrons between an anode and cathode. The dual-spiraling, interleaved channels of each plate are arranged proximate to the membrane-electrode assembly such that a less-depleted product flow and less-depleted feed flow are positioned across the membrane-electrode assembly from each other and flow in the same direction. This maximizes the reactions at the electrodes and the transfer of ions between an anode and cathode. Similarly, a more-depleted product flow and a more-depleted feed flow are positioned across from each other and flow in the same direction. It will be appreciated that the less-depleted product flow could be positioned across from more-depleted feed flow, and possibly in counterflowing arrangements, to improve thermal and electrochemical spatial uniformity.

A further aspect of embodiments of the present disclosure is to provide at least one feed-flow aperture in the feed plate and at least one product-flow aperture in the product plate to stack multiple combinations of a product plate, a membrane-electrode assembly, and a feed plate. These apertures enable product and feed to flow past a first combination of product plate, membrane-electrode assembly, and feed plate to a second combination of product plate, membrane-electrode assembly, and feed plate. Thus, multiple combinations of these components can be arranged in a stack where the voltages produced from each combination add to each other.

One specific embodiment of the present disclosure is a plate that directs a flow of fluid in a membrane reactor, comprising a body extending in a plane, wherein an axis that extends through the body is substantially perpendicular to the plane; an inlet extending into the body, and an outlet extending out of the body; a channel extending between the inlet and the outlet of the body, the channel comprising: a first segment extending between the inlet and a midpoint between the inlet and the outlet, the first segment having at least one turn about the axis; and a second segment extending between the midpoint and the outlet, the second segment having at least one turn about the axis, wherein at least a part of the first segment and at least a part of the second segment are interleaved to provide a more uniform composition of the fluid at a surface of the body.

In some embodiments, the channel is a single, continuous channel between the inlet and the outlet. In various embodiments, the plate further comprises an aperture extending through the body such that a second fluid can flow through the aperture to an inlet of a second plate. In some embodiments, the plate at least partially comprises one of a graphite material, a nickel material, a molybdenum material, an yttrium-doped barium zirconate material, or a cobalt material.

In various embodiments, the first segment turns about the axis in a first direction, and the second segment turns about the axis in an opposing second direction. In some embodiments, two concentrically positioned turns of the first segment define a space therebetween, and at least the part of the second segment extends through the space such that the first and second segments are interleaved. In various embodiments, the inlet, the outlet, and the channel extend completely through the body along the axis, and wherein the inlet, the outlet, and the channel are offset from an outer perimeter of the body such that the outer perimeter is a continuous material. In some embodiments, the channel has a channel width, and a space between adjacent turns of the first and second segments is substantially equal to the channel width.

Another particular embodiment of the present disclosure is a fuel cell for generating electricity from a fuel and an oxidizer, comprising a membrane-electrode assembly having a cathode, an anode, and an electrolyte positioned between the cathode and anode, wherein the membrane-electrode assembly has a planar shape that extends in two lateral directions and has a longitudinal axis that is substantially perpendicular to the two lateral directions; an oxidizer plate positioned proximate to the cathode of the membrane-electrode assembly, the oxidizer plate having an oxidizer channel with a first oxidizer segment that turns about the longitudinal axis in a first direction and with a second oxidizer segment that turns about the longitudinal axis in an opposing second direction; and a fuel plate positioned proximate to the anode of the membrane-electrode assembly, the fuel plate having a fuel channel with a first fuel segment that turns about the longitudinal axis in the first direction and with a second fuel segment that turns about the longitudinal axis in the opposing second direction, wherein the fuel flowing through the fuel channel and the oxidizer flowing through the oxidizer channel causes a chemical reaction that produces electricity.

In some embodiments, the fuel cell further comprises an aperture in the oxidizer plate, wherein the fuel is configured to flow through the aperture into the fuel channel. In various embodiments, the fuel is a combination of methane and water, and the oxidizer is air. In some embodiments, at least a portion of the first oxidizer segment is positioned directly across the membrane-electrode assembly from at least a portion of the first fuel segment, and at least a portion of the second oxidizer segment is positioned directly across the membrane-electrode assembly from at least a portion of the second fuel segment. In various embodiments, the first oxidizer segment and the second oxidizer segment are joined at a midpoint, wherein the oxidizer channel extends along a geometrically smooth path, and the midpoint is a geometric inflection point on the path to promote flow of the oxidizer through the oxidizer channel.

A further particular embodiment of the present disclosure is a system for producing hydrogen from a feed and electricity, comprising a membrane-electrode assembly having a cathode, an anode, and an electrolyte positioned between the cathode and anode; a first plate positioned proximate to the anode of the membrane-electrode assembly, the first plate having a first channel arranged in a dual alternating pattern; a second plate positioned proximate to the cathode of the membrane-electrode assembly, the second plate having a second channel arranged in a dual alternating pattern; a heat source that raises a temperature of the membrane-electrode assembly, the first plate, and the second plate to an operating temperature; and an electrical source that supplies electricity to the first and second plates to extract a hydrogen gas from the feed flowing through the first channel in the first plate.

In some embodiments, the first channel has a first segment that turns about a longitudinal axis in a first direction and has a second segment that turns about the longitudinal axis in an opposing second direction, and wherein the second channel has a third segment that turns about the longitudinal axis in the first direction and has a fourth segment that turns about the longitudinal axis in the opposing second direction. In various embodiments, the system further comprises a compressor that pressurizes the hydrogen gas from a first pressure to a greater second pressure. In some embodiments, the first pressure is approximately 5 bar. In various embodiments, a product flowing out of the second plate comprises water and carbon dioxide. In some embodiments, the cathode and the anode are each a Ni-BCZY material, and the electrolyte is a BCZYYb material such that the membrane-electrode assembly is symmetric about a plane extending through the electrolyte. In various embodiments, the operating temperature is between approximately 600° C. and 700° C.

To provide additional background, context, and to further satisfy the written description requirements of 35 U.S.C. § 112, the following references are incorporated by reference herein in their entireties:

1. "Three Dimensional Analysis of a PEM Fuel Cell with the Shape of a Fermat Spiral for the Flow Channel Configuration," Juarez-Robles D., Hernandez-Guerrero A., Damian-Ascencio C. E., Rubio-Arana C., Proceedings of IMECE2008 ASME International Mechanical Engineering Congress & Exposition Oct. 31-Nov. 6, 2008, Boston, Massachusetts.

2. WIPO Publication No. 2019/117859 to Du et al. entitled "Multifunctional Manifold for Electrochemical Devices and Methods for Making the Same."

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the disclosure and together with the Summary of the Invention given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|--------|-----------|
| 10 | Membrane reactor |
| 12 | Anode |
| 14 | Cathode |
| 16 | Electrolyte |
| 18 | Membrane-Electrode Assembly |
| 20 | Feed Flow |
| 22 | Product Flow |
| 24 | Plate |
| 26 | Channel |
| 28 | Product Plate |
| 30 | Product Channel |
| 32 | Product Inlet |
| 34 | Product Outlet |
| 36 | Feed Aperture |

-continued

| Number | Component |
|--------|-----------|
| 38 | Feed Plate |
| 40 | Feed Channel |
| 42 | Feed Inlet |
| 44 | Feed Outlet |
| 46 | Product Aperture |
| 48 | First Portion |
| 50 | Turn |
| 52 | Channel Width |
| 54 | Channel Spacing |
| 56 | Midpoint |
| 58 | Second Portion |
| 60 | Turn |
| 62 | Channel Width |
| 64 | Channel Spacing |
| 66 | Axis |
| 68 | Fuel Cell |
| 70 | Membrane-Electrode Assembly |
| 72 | Electric Load |
| 74 | Anode |
| 76 | Cathode |
| 78 | Electrolyte |
| 80 | Less-Depleted Feed Flow |
| 82 | Less-Depleted Product Flow |
| 84 | More-Depleted Feed Flow |
| 86 | More-Depleted Product Flow |
| 88 | Reformer |
| 90 | Input Gas |
| 92 | Plate Stack |
| 94 | Heater |
| 96 | Spring Bolt |
| 98 | Hydrogen |
| 100 | Output Gas |
| 102 | Plate |
| 104 | Membrane-Electrode Assembly |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures membrane reactors, plates, and methods and systems for using the same, the present disclosure is not limited to these embodiments.

Figure 3A:
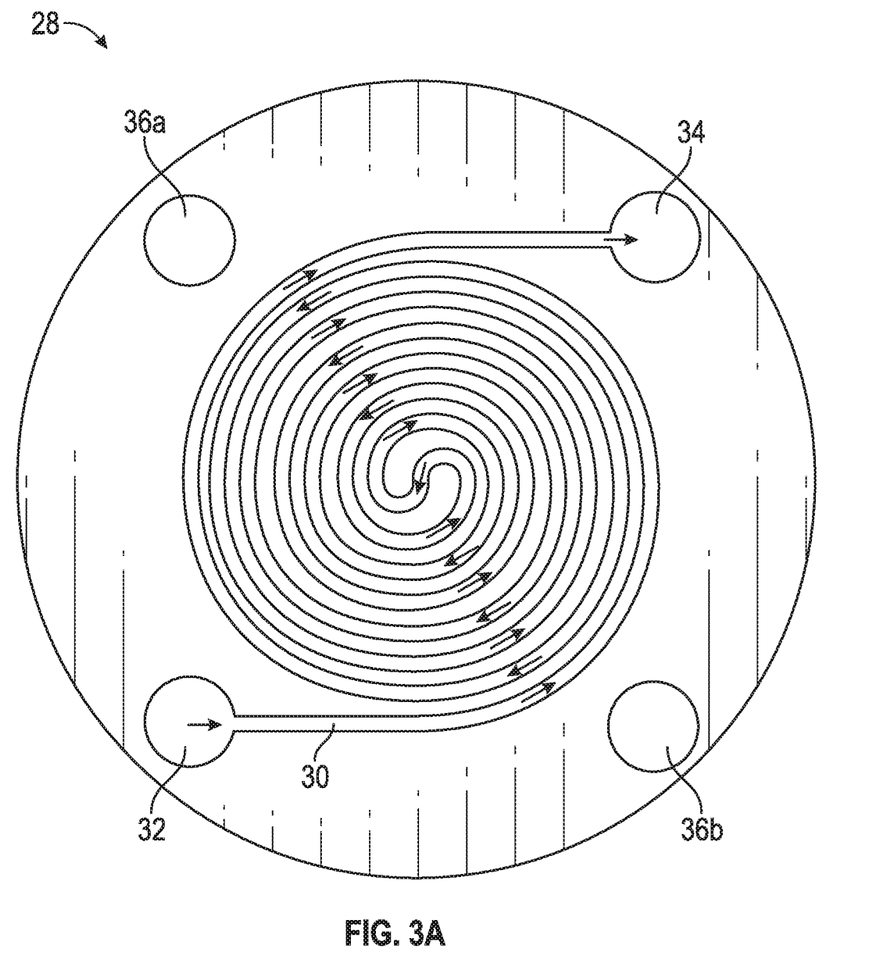
FIG. 3A is a top plan view of an oxidizer plate for use in a fuel cell in accordance with an embodiment of the present disclosure.
Figure 3B:
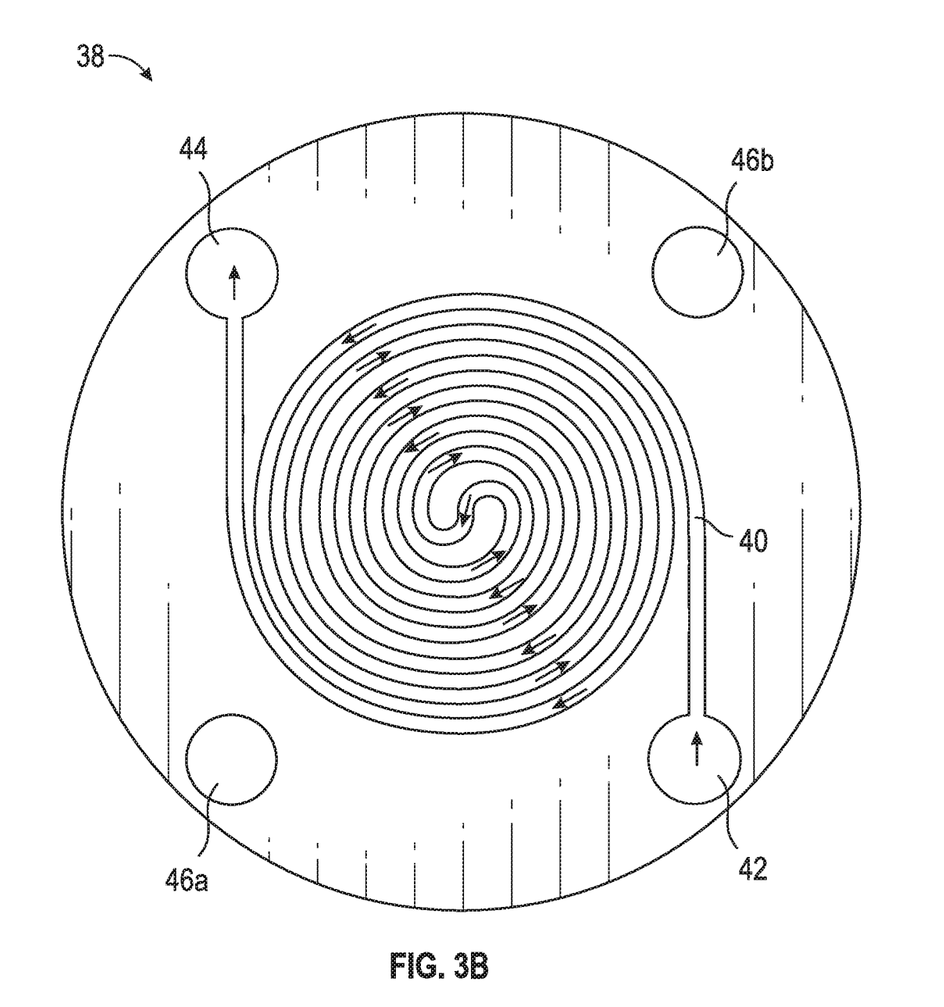
FIG. 3B is a top plan view of a feed of a product plate for use in a membrane reactor in accordance with an embodiment of the present disclosure.

Now referring to FIGS. 3A and 3B, top plan views of a product plate 28 and a feed plate 38 are provided, respectively. The product plate 28 has a body with a planar shape extending in two lateral dimensions and has a circular outer perimeter when viewed from the top, though it will be appreciated that embodiments of the present disclosure encompass other shapes. The product plate 28 has a channel 30 that extends between an inlet 32 and an outlet 34 to direct the flow of a product against a membrane-electrode assembly. The channel 30 in this embodiment is a single, continuous channel 30, and the channel 30 turns upon itself from the inlet 32 to a midpoint between the inlet 32 and outlet 34. At the midpoint, the channel 30 turns upon itself from the midpoint to the outlet 34 in an opposing direction.

The channel 30 can be described in geometric terms as it extends from the inlet 32 to the outlet 34. For example, the channel 30 can be described as extending along a path that is geometrically smooth, meaning each point along the path has only a single tangent line. In practical terms, the smooth path promotes the flow of fluid through the channel 30 unimpeded and without abrupt turns or changes in the path. Moreover, in some embodiments, the path of the channel 30 has only a single geometric inflection point at the midpoint of the path. While the channel 30 can be described in these geometric terms, embodiments of the present disclosure can encompass any shape or type of channel 30.

The resulting channel 30 forms a dual-spiraling, interleaving configuration where segments of the channel 30 alternate between less-depleted oxidizer and more-depleted oxidizer. This pattern can also be described as alternating flow directions when moving from an outer portion of the plate 28 to the center of plate 28, as shown by the alternating arrows showing the direction of flow in the channel 30. The channel 30 also initially spirals inwardly and then outwardly after passing a midpoint. Thus, the least-depleted product passes by the most-depleted product at an outer portion of the channel 30, which is experienced as an average composition and temperature by the membrane-electrode assembly. Moreover, at the center or midpoint of the channel 30, the product is essentially partially-depleted or half-depleted, which is also experienced as an average composition and temperature by the membrane-electrode assembly. Therefore, the membrane-electrode assembly experiences a less-severe temperature gradient as Nernst potential and performance varies along the length of the channel 30 to increase performance and longevity of the system.

The product plate 28 can also have one or more feed apertures 36a, 36b that direct the flow of fuel through the product plate 28 in a larger membrane-reactor assembly, as described in further detail below. As depicted, the channel 30, the inlet 32, the outlet 34, and the feed apertures 36a, 36b can extend completely through and perpendicular to the body of the product plate 28 and from a first surface to a second surface opposite the first surface when viewed in cross-section. Moreover, these features 30, 32, 34, 36a, 36b are offset from a perimeter edge of the body of the product plate 28 such that the perimeter edge is continuous and solid to seal product flow within the plate 28. Moreover, the channel 30 is offset from the feed apertures 36a, 36a to keep the feed and product separate. The membrane-electrode assembly itself, spacer plates, and other features can further seal the product flow within a larger stack of plates and assemblies.

The feed plate 38 shown in FIG. 3B is similar to the product plate 28 in FIG. 3A. The feed plate 38 comprises a channel 40 that extends between an inlet 42 and an outlet 44 in a dual-spiraling configuration. The feed plate 38 also has product apertures 46a, 46b that allow product to flow through the fuel plate 38 in a membrane-reactor system. In various embodiments, the product plate and feed plate are made from an electrically conductive material such as a metal to support either the collection or application of electric power as described in further detail below with respect to fuel cells and steam reforming.

Figure 4A:
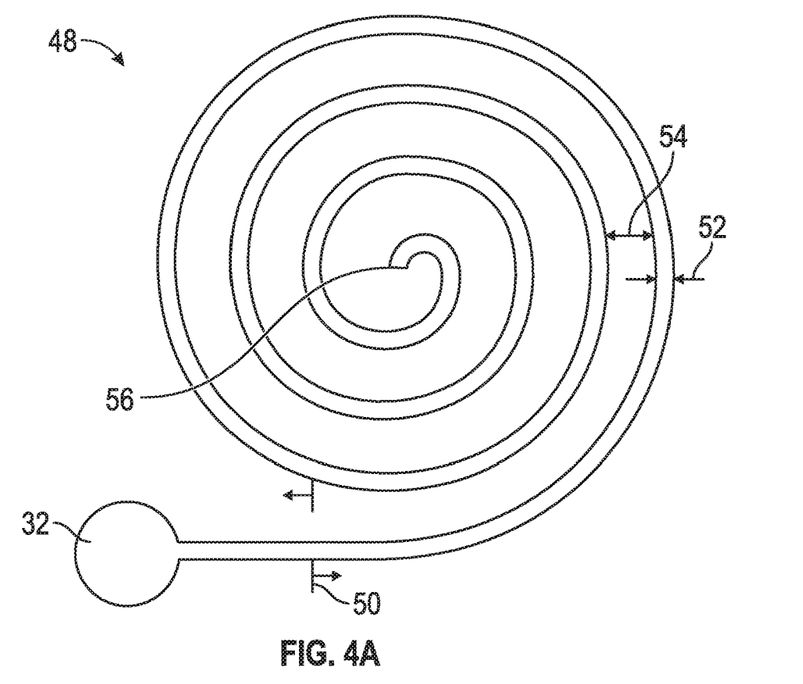
FIG. 4A is a top plan view of a first segment of a channel of the product plate in FIG. 3A in accordance with an embodiment of the present disclosure.
Figure 4B:
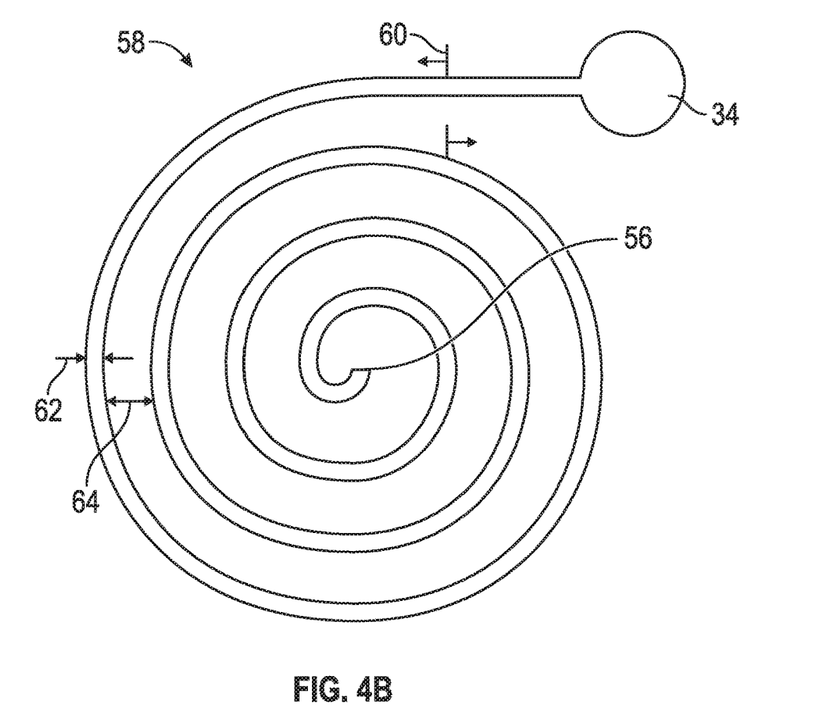
FIG. 4B is a top plan view of a second segment of a channel of the product plate in FIG. 3A in accordance with an embodiment of the present disclosure.

Now referring to FIGS. 4A and 4B, top plan views of a first segment 48 and a second segment 58 of the product channel of FIG. 3A are provided, respectively. The first segment 48 of the channel in FIG. 4A extends from the product inlet 32 to a midpoint 56. The first segment 48 can be described as turning upon itself in a smaller and smaller spiral or smaller and smaller turns. One complete turn 50 of the first segment 48 is shown in FIG. 4A, and it will be appreciated that in some embodiments, the first segment 48 has at least one turn 50 or multiple turns 50.

The first segment 48 also has a channel width 52 and a channel spacing 54 between adjacent channels of the first segment 48. In this embodiment, the channel width 52 and spacing 54 are constant, but it will be appreciated that embodiments of the present disclosure can encompass varying channel widths 52 and/or spacings 54. The channel width 52 is smaller than the spacing 54 to accommodate the second segment 58 of FIG. 4B in an interleaving or alternating arrangement. In some embodiments, the spacing 54 is approximately three times larger than the channel width 52 so that when a portion of the second segment extends in the channel width 52, the spacing between adjacent channels of the first and second segments 48, 58 is approximately the same as the channel width 52. The term "approximately" can imply a variation of +/−10% on a relative basis. With interleaving channels of the first and second segments 48, 58 in relatively close proximity, the composition and temperatures experienced by a membrane-electrode assembly are more even and uniform to improve the performance and longevity of the membrane-electrode assembly and the overall system.

The second segment 58 in FIG. 4B has a similar construction as the first segment 48 in FIG. 4A. The second segment 58 extends from the midpoint 56 to the outlet 34. However, the second segment 58 turns about the midpoint 56 in a direction opposing the first segment 48. From the top plan views in FIGS. 4A and 4B, the first segment 48 turns with a right handedness, and the second segment 58 turns with a left handedness. The second segment 58 also has at least one turn 60 and a channel width 62 that is less than a channel spacing 64 to accommodate the first segment 48. When the segments 48, 58 are joined at the midpoint 56, the segments are interleaved with each other to provide the alternating flows of less-depleted and more-depleted product. In other words, part of a second segment can extend between concentric turns of a first segment, or vice versa, to form a dual interleaving pattern.

Figure 5:
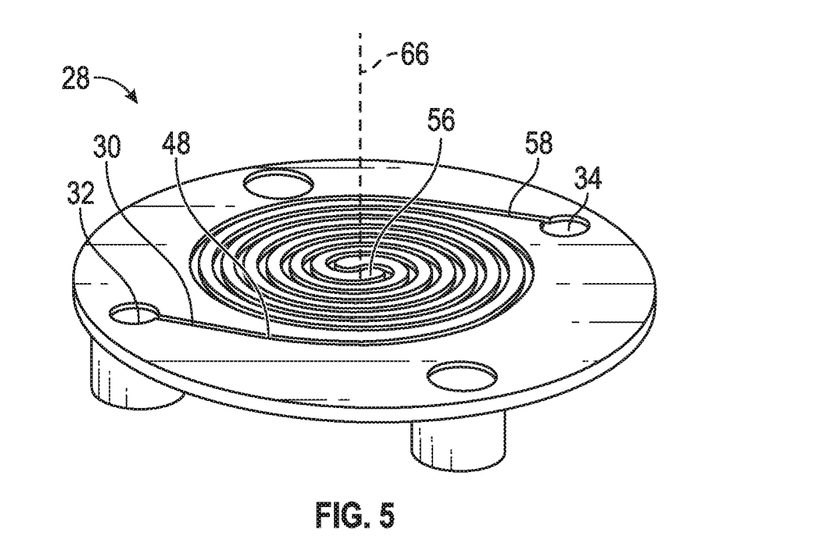
FIG. 5 is a perspective view of the product plate in FIG. 3A in accordance with an embodiment of the present disclosure.

Now referring to FIG. 5, a perspective view of the product plate 28 is provided. As shown, the first segment 48 of the channel 30 extends from the inlet 32 to the midpoint 56, and then the second segment 58 of the channel 30 extends from the midpoint 56 to the outlet 34. A longitudinal axis 66 extends through the plate 28, and the axis 66 is substantially perpendicular to the two planar directions of the plate 28 where the term "substantially" can imply a variation of +/−10% on a relative basis. In this embodiment, the axis 66 coincides with the midpoint 56. However, the midpoint 56 can be described as the center of the plate 28, the halfway point between the inlet 32 and outlet 34, or simply any point between the inlet 32 and outlet 34. The first segment 48 can be described as turning about the axis 66 with a first handedness, and the second segment 58 can be described as turning about the axis 66 with a second, opposed handedness.

Figure 6:
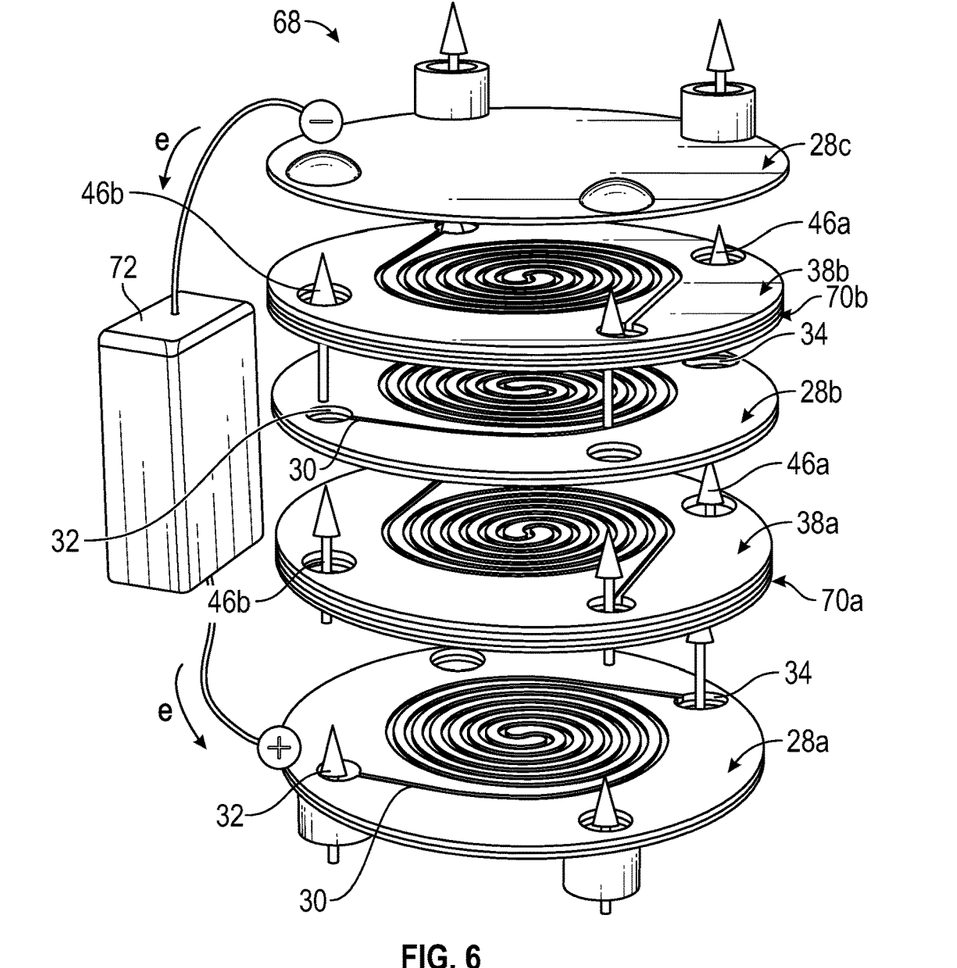
FIG. 6 is a perspective view of fuel cell with the oxidizer plate of FIG. 3A and the fuel plate of FIG. 3B in accordance with an embodiment of the present disclosure.

Now referring to FIG. 6, an exploded perspective view of a membrane reactor (configured as a fuel cell) 68 is provided. The fuel cell 68 has alternating oxidizer plates 28a, 28b and fuel plates 38a, 38b with a first membrane-electrode assembly 70a positioned between the first oxidizer plate 28a and the first fuel plate 38a and a second membrane-electrode assembly 70b positioned between the second oxidizer plate 28b and the second fuel plate 38b. An electric device 72, such as a battery, collects the electricity generated by the fuel cell 68.

The arrows show the flow of product and feed through the membrane reactor 68. Regarding the flow of product, the flow begins at the inlet 32 of the first product plate 28a. A portion of the product flows through the channel 30 of the first product plate 28a to the outlet 34 of the first product plate 28a. Then, this portion of the product flows through a product aperture 46a in the first feed plate 38a, an outlet 34 of the second product plate 28b, a product aperture 46a of the second feed plate 38b, and out of the membrane reactor (fuel cell) 68.

Another portion of the product passes through a product aperture 46b in the first feed plate 38a to reach the inlet 32 of the second product plate 28b. Then, this portion of the product flows through the channel 30 of the second product plate 28b to the outlet 34 of the second product plate 28b. This portion of the product rejoins the other portion of the product to pass through the product aperture 46a in the second feed plate 38b and exit the membrane reactor 68.

Similar to the product flow, the feed can flow through the feed plates 38a, 38b and out of the membrane reactor 68. The feed flow initially bypasses the first product plate 28a through a feed aperture. Then, one portion of the feed flows through the first feed plate 38a, a feed aperture in the second product plate 28b, an outlet of the second feed plate 38b, and out of the membrane reactor 68. Another portion of the feed passes through a feed aperture in the second product plate 28b, the second feed plate 38b to rejoin the other portion of the feed, and exit the membrane reactor 68. Finally, spacer plates can be added as needed to keep the feed and products flows separated. For example, in some embodiments a spacer plate is positioned between a first feed plate 38a and a second product plate 28b.

Figure 7:
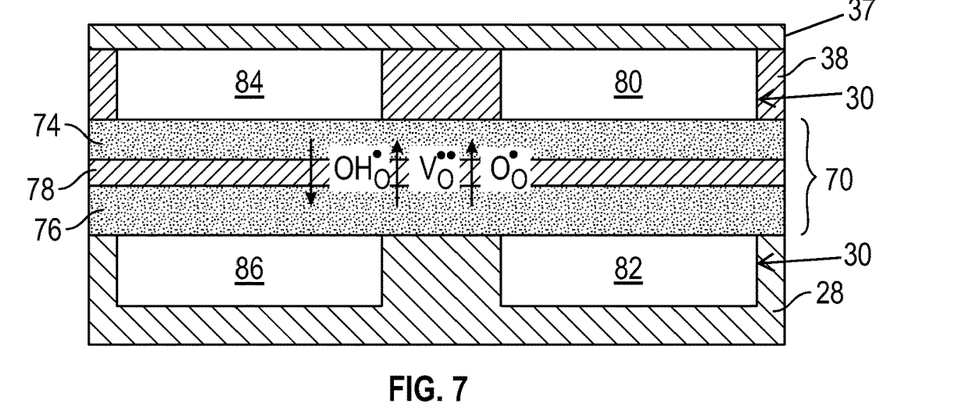
FIG. 7 is a cross-sectional view of an oxidizer plate, a fuel plate, and a membrane-electrode assembly in accordance with an embodiment of the present disclosure.

Now referring to FIG. 7, a cross section of a product plate 28, a feed plate 38, and a membrane-electrode assembly 70 between the plates 28, 38 is provided. The membrane-electrode assembly 70 generally comprises an anode 74, a cathode 76, and an electrolyte 78 positioned therebetween. The anode 74 and cathode 76 in this embodiment are each porous nickel-barium cerate zirconate (Ni-BCZY), and the electrolyte 78 is $BaCe_{0.7}Zr_{0.1}Yb_{0.1}Yb_{0.1}O_{3-\delta}$ (BCZYYb). In this sense, the assembly 70 is symmetric about a horizontal plane through the electrolyte 78. Moreover, as Ni oxidation is avoided in this embodiment, specialized oxygen-tolerant electrodes are not required. It will be appreciated that embodiments of the present disclosure encompass a variety of anode materials, cathode materials, and electrolyte materials.

As shown in FIG. 7, the cross-section view shows that the arrangement of plates 28, 38 positions a less-depleted feed 80 adjacent to a less-depleted product 82 and a more-depleted feed 84 adjacent to a more-depleted product 86. Further, the less-depleted feed and product 80, 82 flow in a first direction, and the more-depleted feed and product 84, 86 flow in an opposing second direction. It will be appreciated that in some embodiments, a less-depleted feed 80 may be arranged across the membrane-electrode assembly 70 from a more-depleted product 86, and a more-depleted feed 84 is arranged across a less-depleted product 82. In some embodiments, the product flows at a sufficiently high rate that the product does not deplete as quickly as the feed, and thus, the Nernst potential depends more on the depletion of the feed, which can deplete along the length of the channel. In various embodiments the plates may establish a counterflowing feed and product.

At the input of the fuel cell, the fuel in this embodiment is a combination of methane ($CH_4$) and water ($H_2O$), and the oxidizer is moist air. At the output of the fuel cell, the fuel is a combination of carbon dioxide ($CO_2$) and water ($H_2O$), and the oxidizer is a combination of water ($H_2O$) and air. The charge transfer between the fuel and oxidizer is shown in FIG. 7.

Figure 8A:
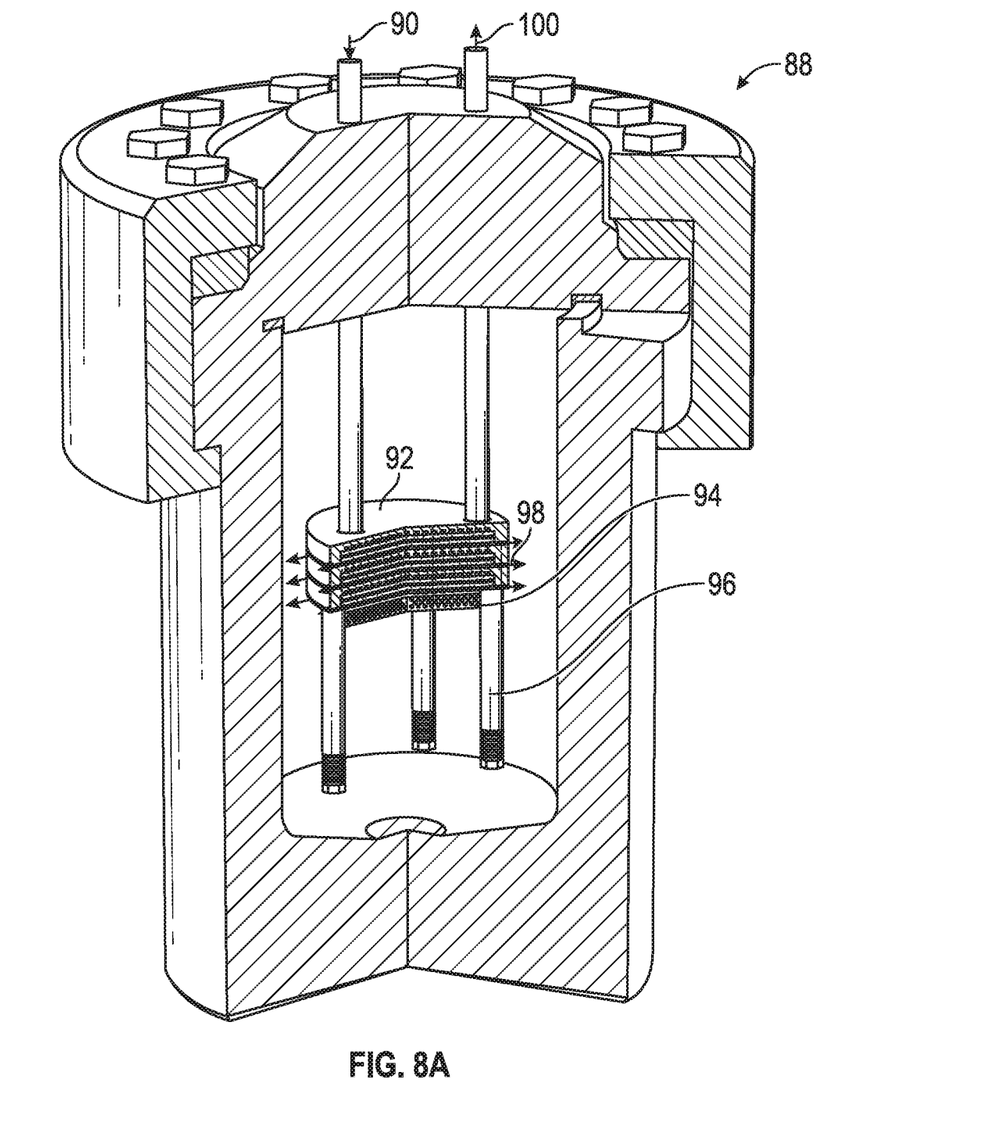
FIG. 8A is a partial cross-sectional, perspective view of a reformer in accordance with an embodiment of the present disclosure.
Figure 8B:
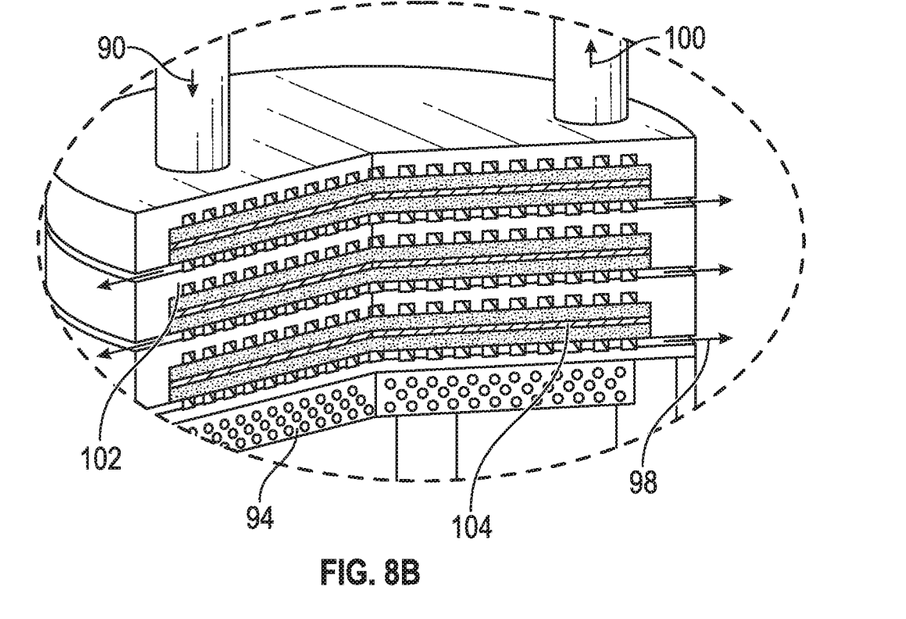
FIGS. 8B and 8C are further, perspective views of the reformer in FIG. 8A in accordance with an embodiment of the present disclosure.
Figure 8C:
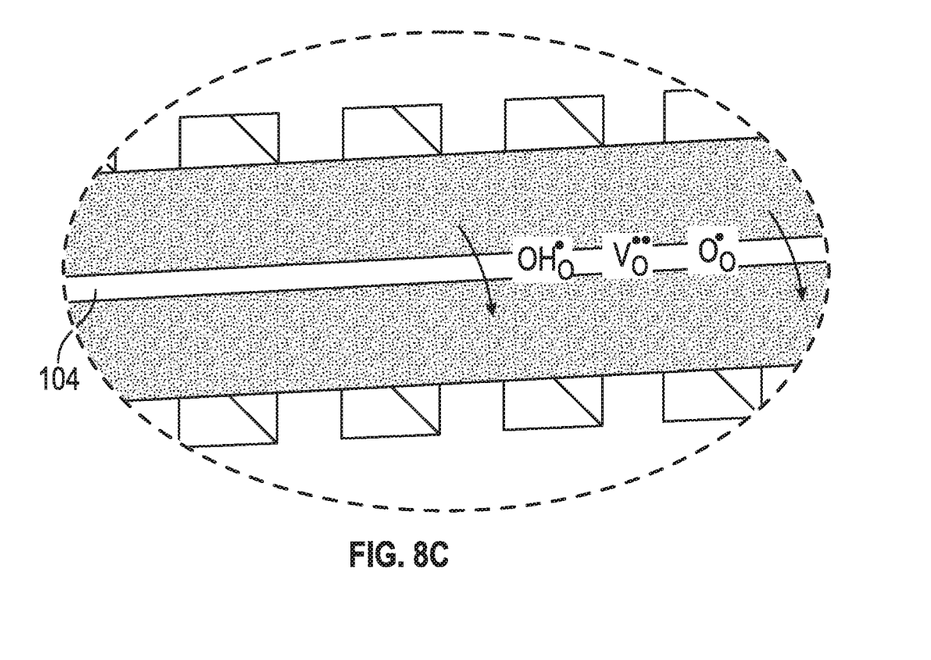

Now referring to FIGS. 8A-8C, various cross-sectional, perspective views of a reformer 88 are provided. Some embodiments described herein relate to a fuel cell where the chemical energy of a fuel and an oxidizing agent is converted into electricity. Embodiments described herein may also relate to, for example, a reformer 88 where electricity and a gas such as methane are supplied to the reformer 88 and a gas, such as hydrogen, is produced. As shown, an input gas 90 enters the reformer 88 and travels to a plate stack 92. The plate stack 92 can include membrane-electrode assemblies and the same or similar plates as described elsewhere herein with a dual interleaving channel where a feed interacts with an anode and a product interacts with a cathode of the assembly. A heater 94 raises the temperature of the plate stack 92 to an operating temperature between approximately 600 and 700° C., and a spring bolt 96 secures the plate stack 92. In contrast to convention fuel cells, electricity is supplied to the plate stack 92. As a result, in one embodiment, the input gas 90 is a combination methane ($CH_4$) and steam ($H_2O$), and the produced gas 98 is hydrogen ($H_2$), and the output gas 100 is a combination of carbon dioxide ($CO_2$) and water ($H_2O$). As shown in FIGS. 8B and 8C, the plate stack can comprise plates 102 and membrane-electrode assemblies 104.

The produced gas 98 can exit the reformer 88 at an elevated pressure, for instance, 5 bar. However, greater pressures are required for storage, chemical processing, and other applications. Therefore, in some embodiments and systems, a compressor such as one based on a polymer-electrolyte membrane (PEM) can pressurize the produced gas from a first pressure to a second pressure. In some embodiments, hydrogen from the reformer is pressurized to approximately 700 bar. The pressurized hydrogen can then be used for various applications.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A plate that directs a flow of fluid in a membrane reactor, comprising:
   a body extending in a plane, the body having a first surface and a second surface parallel to and spaced from the first surface, wherein an axis that extends through said body is substantially perpendicular to said plane;
   an inlet extending into said body, and an outlet extending out of said body;
   a first aperture and a second aperture each extending completely through said body along said axis;
   the body consisting of one channel extending between said inlet and said outlet of said body, said channel comprising:
   a first segment extending between said inlet and a midpoint between said inlet and said outlet, said first segment having at least one turn about said axis; and
   a second segment extending between said midpoint and said outlet, said second segment having at least one turn about said axis, wherein at least a part of said first segment and at least a part of said second segment are interleaved to provide a more uniform composition of said fluid at a surface of said body,
   wherein a fuel comprising a combination of methane and water flows through the channel,
   wherein said first aperture and said second aperture are each unconnected to said channel, and
   wherein said channel along an entire length of said channel extends completely through said body along said axis and from the first surface to the second surface when viewed in cross-section.

2. The plate of claim 1, wherein said channel is a single, continuous channel between said inlet and said outlet.

3. The plate of claim 1, wherein at least one of the first aperture and the second aperture enable a second fluid to flow through said at least one of the first aperture and the second aperture to an inlet of a second plate.

4. The plate of claim 1, wherein said plate at least partially comprises one of a graphite material, a nickel material, a molybdenum material, an yttrium-doped barium zirconate material, or a cobalt material.

5. The plate of claim 1, wherein said first segment turns about said axis in a first direction, and said second segment turns about said axis in an opposing second direction.

6. The plate of claim 1, wherein two concentrically positioned turns of said first segment define a space therebetween, and at least said part of said second segment extends through said space such that said first and second segments are interleaved.

7. The plate of claim 1, wherein said inlet and said outlet extend completely through said body along said axis, and wherein said inlet, said outlet, and said channel are offset from an outer perimeter of said body such that said outer perimeter is a continuous material.

8. The plate of claim 1, wherein said channel has a channel width, and a space between adjacent turns of said first and second segments is substantially equal to said channel width.

9. A plate that directs a flow of fluid in a membrane reactor, comprising:
   a body extending in a plane, the body having a first surface and a second surface parallel to and spaced from the first surface, wherein an axis that extends through said body is substantially perpendicular to said plane;
   an inlet extending into said body, and an outlet extending out of said body;
   a first aperture and a second aperture each extending completely through said body along said axis;
   the body consisting of one channel extending between said inlet and said outlet of said body, said channel comprising:
   a first segment extending between said inlet and a midpoint between said inlet and said outlet, said first segment having at least one turn about said axis; and
   a second segment extending between said midpoint and said outlet, said second segment having at least one turn about said axis, wherein at least a part of said first segment and at least a part of said second segment are interleaved to provide a more uniform composition of said fluid at a surface of said body,
   wherein an oxidizer comprising moist air flows through the channel, wherein said first aperture and said second aperture are each unconnected to any channel, and
   wherein said channel along an entire length of said channel extends completely through said body along said axis and from the first surface to the second surface when viewed in cross-section.

10. The plate of claim 9, wherein said channel is a single, continuous channel between said inlet and said outlet.

11. The plate of claim 9, wherein at least one of the first aperture and the second aperture enable a second fluid to flow through said at least one of the first aperture and the second aperture to an inlet of a second plate.

12. The plate of claim 9, wherein said plate at least partially comprises one of a graphite material, a nickel material, a molybdenum material, an yttrium-doped barium zirconate material, or a cobalt material.

13. The plate of claim 9, wherein said first segment turns about said axis in a first direction, and said second segment turns about said axis in an opposing second direction.

14. The plate of claim 9, wherein two concentrically positioned turns of said first segment define a space therebetween, and at least said part of said second segment extends through said space such that said first and second segments are interleaved.

15. The plate of claim 9, wherein said inlet and said outlet extend completely through said body along said axis, and wherein said inlet, said outlet, and said channel are offset from an outer perimeter of said body such that said outer perimeter is a continuous material.

16. The plate of claim 9, wherein said channel has a channel width, and a space between adjacent turns of said first and second segments is substantially equal to said channel width.

* * * * *